US007842321B2

(12) United States Patent
Mori et al.

(10) Patent No.: US 7,842,321 B2
(45) Date of Patent: Nov. 30, 2010

(54) METHOD OF CONCENTRATING MINOR INGREDIENT CONTAINED IN OILY MATTER OBTAINED FROM PLANT TISSUE

(75) Inventors: Osamu Mori, Yokohama (JP); Ikukazu Tashima, Yokohama (JP); Masami Bito, Shizuoka (JP); Takashi Yamaguchi, Shizuoka (JP); Satoshi Konishi, Shizuoka (JP)

(73) Assignee: Ajinomoto Co., Inc., Tokyo (JP)

( * ) Notice: Subject to any disclaimer, the term of this patent is extended or adjusted under 35 U.S.C. 154(b) by 764 days.

(21) Appl. No.: 11/589,802

(22) Filed: Oct. 31, 2006

(65) Prior Publication Data

US 2007/0134384 A1 Jun. 14, 2007

Related U.S. Application Data

(63) Continuation of application No. PCT/JP2005/019223, filed on Oct. 19, 2005.

(30) Foreign Application Priority Data

Oct. 19, 2004 (JP) ............................ 2004-304131

(51) Int. Cl.
*A23L 1/221* (2006.01)

(52) U.S. Cl. ....................... 426/425; 426/474; 426/481; 426/489; 203/71

(58) Field of Classification Search ....................... None
See application file for complete search history.

(56) References Cited

U.S. PATENT DOCUMENTS

| | | | | |
|---|---|---|---|---|
| 2,753,362 A * | 7/1956 | Owades et al. | .............. | 552/545 |
| 5,773,075 A * | 6/1998 | Todd | .......................... | 426/638 |
| 5,985,345 A * | 11/1999 | Todd | .......................... | 426/481 |
| 6,013,304 A * | 1/2000 | Todd | .......................... | 426/638 |
| 6,074,687 A * | 6/2000 | Todd | .......................... | 426/638 |

FOREIGN PATENT DOCUMENTS

| | | |
|---|---|---|
| JP | 62-223291 | 10/1987 |
| JP | 5-3764 | 1/1993 |
| JP | 10-508605 | 8/1998 |
| JP | 2001-112432 | 4/2001 |
| JP | 2002-218994 | 8/2002 |

OTHER PUBLICATIONS

Buzina, M.A., G.A. Osipov, and V.V. Znamenskii, Neutral Lipids From *Capsicum annum*: Rough Evaluation of Antioxidant and Radioprotective Activity, Pharmaceutical Chemistry Journal, 1996, vol. 30, No. 7, pp. 469-471.*

JP 10-508605, Machine translation, Aug. 25, 1998.*

* cited by examiner

*Primary Examiner*—Jennifer C McNeil
*Assistant Examiner*—Hong Mehta
(74) *Attorney, Agent, or Firm*—Oblon, Spivak, McClelland, Maier & Neustadt, L.L.P.

(57) ABSTRACT

Fat-soluble trace constituents contained in plant tissues may be conveniently concentrated and/or purified by a method which involves extracting the fat-soluble trace constituent from a plant, to obtain an extract containing the fat-soluble trace constituent; adding a fatty acid ester to the extract, to obtain a mixture; and subjecting the mixture to molecular distillation. The method is particularly effective for the concentration and/or purification of fat-soluble constituents which are solids or viscous liquids at ambient temperature and ordinary pressure. The concentrated and/or purified fat-soluble trace constituent of a plant tissue prepared by the method may be combined with a food or drink to afford a food or drink product that contains the concentrated and/or purified fat-soluble trace constituent.

19 Claims, No Drawings

METHOD OF CONCENTRATING MINOR INGREDIENT CONTAINED IN OILY MATTER OBTAINED FROM PLANT TISSUE

CROSS REFERENCES TO RELATED APPLICATIONS

This application is a continuation of International Patent Application No. PCT/JP05/19223, filed on Oct. 19, 2005, and claims priority to Japanese Patent Application No. 304131/2004, filed on Oct. 19, 2004, both of which are incorporated herein by reference in their entireties.

BACKGROUND OF THE INVENTION

1. Field of the Invention

The present invention relates to methods for concentrating and/or purifying a fat-soluble trace constituent contained in a plant. The present invention also relates to methods for making a concentrated and/or purified fat-soluble trace constituent of a plant and the concentrated and/or purified fat-soluble trace constituent of a plant prepared by such a method. The present invention further relates to food products that include such a concentrated and/or purified fat-soluble trace constituent and methods for making such a food product.

2. Discussion of the Background

Plant tissues contain fat-soluble trace constituents having useful physiological activating functions, such as plant sterols and tocopherols. In order to concentrate such trace constituents, a method where by-products and scum produced in a deodorizing process for edible plant oil are subjected to molecular distillation or the like has been commonly carried out. A method is known where, at that time, a fatty acid having 10 to 22 carbons is added to a distillate of the plant oil so as to esterify sterol, etc., and then a molecular distillation is carried out to concentrate the aimed constituents (see, Japanese Patent Laid Open No. 10-508605).

On the other hand, particularly with regard to spices and flavors, the following method has come into wide use: a medium-chain fatty acid triglyceride (MCT) is used as an extracting solvent whereby the desired trace constituents are concentrated.

For example, the following methods have been known: a method where MCT is added to a fermented food, extraction by heating and filtration is conducted, and a highly oil-absorbing dextrin is added to the liquid extract, to yield an edible flavor preparation (see, Japanese Patent Laid Open No. 05-003764); and a method where roasted sesame oil is subjected to steam distillation and MCT is added to the resulting distillate to obtain a roasted sesame flavor (see, Japanese Patent Laid Open No. 2001-112432).

However, when the aforementioned trace constituents are solid or a viscous liquid at ordinary temperature (25° C.) and, further, they are present in very low concentrations in a raw material, there is a problem that, when a mere molecular distillation is conducted, they are firmly adhered onto a condensing surface so that a sufficient recovery rate is not achieved. Another disadvantage is that, even when an extracting operation is conducted using MCT as a solvent, the desired concentration of an aimed substance is not reliably achieved.

In view of the foregoing, there remains a need for a method of concentrating and/or purifying specific fat-soluble trace constituents that are hard to process, in which fixation of these trace constituents onto a condensing surface while conducting molecular distillation is prevented, such that a high quality concentration of these trace constituents is obtained.

SUMMARY OF THE INVENTION

Accordingly, it is one object of the present invention to provide novel methods for concentrating and/or purifying a fat-soluble trace constituent from a plant.

It is another object of the present invention to provide novel methods for concentrating and/or purifying a fat-soluble trace constituent from a plant quickly and in high yields, even when the constituents is in low concentration and is solid or viscous such that they are hard to process.

It is another object of the present invention to provide novel methods of making a concentrate of a fat-soluble trace constituent of a plant.

It is another object of the present invention to provide novel concentrates of fat-soluble trace constituents of a plant which are prepared by such a method.

It is another object of the present invention to provide novel food products which contain such a concentrate.

It is another object of the present invention to provide novel methods of making such a food product.

These and other objects, which will become apparent during the following detailed description, have been achieved by the inventors' discovery that, in the concentration and/or purification of specific fat-soluble trace constituents which are hard to process, when a specific fatty acid is added to the raw material which contains the trace constituent, and molecular distillation is carried out, the fluidity of the distillate is maintained and a concentrated composition of high quality is obtained.

Accordingly, the present invention provides the following:

(1) A method of concentrating and/or purifying a fat-soluble trace constituent of a plant, said method comprising:

(a) extracting at least one fat-soluble trace constituent which has a vapor pressure of 0.1 to 30 Pa at 150° C. to 200° C. from a plant tissue, to obtain an extract which comprises said at least one fat-soluble trace constituent;

(b) adding 1 to 25% by weight of at least one fatty acid ester which has a vapor pressure of 0.06 to 30 Pa at 150° C. to 200° C. to said extract, to obtain a mixture; and (c) subjecting said mixture to molecular distillation at a temperature ranging from 150° C. to 200° C. and pressure ranging from 0.8 Pa to 30 Pa.

(2) A method of making a concentrate of fat-soluble trace constituents of a plant, said method comprising:

(a) extracting at least one fat-soluble trace constituent which has a vapor pressure of 0.1 to 30 Pa at 150° C. to 200° C. from a plant tissue, to obtain an extract which comprises said at least one fat-soluble trace constituent;

(b) adding 1 to 25% by weight of at least one fatty acid ester which has a vapor pressure of 0.06 to 30 Pa at 150° C. to 200° C. to said extract, to obtain a mixture; and (c) subjecting said mixture to molecular distillation at a temperature ranging from 150° C. to 200° C. and pressure ranging from 0.8 Pa to 30 Pa.

(3) A concentrate of a fat-soluble trace component of a plant, which is prepared by a process, said process comprising:

(a) extracting at least one fat-soluble trace constituent which has a vapor pressure of 0.1 to 30 Pa at 150° C. to 200° C. from a plant tissue, to obtain an extract which comprises said at least one fat-soluble trace constituent;

(b) adding 1 to 25% by weight of at least one fatty acid ester which has a vapor pressure of 0.06 to 30 Pa at 150° C. to 200° C. to said extract, to obtain a mixture; and (c) subjecting said mixture to molecular distillation at a temperature ranging from 150° C. to 200° C. and pressure ranging from 0.8 Pa to 30 Pa.

(4) A food or drink product, which comprises:

(A) at least one food or drink; and (B) at least one concentrate of a fat-soluble trace component of a plant, wherein said at least one concentrate of a fat-soluble trace component of a plant is prepared by a process, said process comprising:

(a) extracting at least one fat-soluble trace constituent which has a vapor pressure of 0.1 to 30 Pa at 150 C to 200 C from a plant tissue, to obtain an extract which comprises said at least one fat-soluble trace constituent;

(b) adding 1 to 25% by weight of at least one fatty acid ester which has a vapor pressure of 0.06 to 30 Pa at 150 C to 200 C to said extract, to obtain a mixture; and (c) subjecting said mixture to molecular distillation at a temperature ranging from 150° C. to 200° C. and pressure ranging from 0.8 Pa to 30 Pa.

(5) A method of making a food or drink product, said method comprising:

(1) combining:

(A) at least one food or drink; and (B) at least one concentrate of a fat-soluble trace component of a plant, wherein said at least one concentrate of a fat-soluble trace component of a plant is prepared by a process, said process comprising:

(a) extracting at least one fat-soluble trace constituent which has a vapor pressure of 0.1 to 30 Pa at 150° C. to 200° C. from a plant tissue, to obtain an extract which comprises said at least one fat-soluble trace constituent;

(b) adding 1 to 25% by weight of at least one fatty acid ester which has a vapor pressure of 0.06 to 30 Pa at 150° C. to 200° C. to said extract, to obtain a mixture; and (c) subjecting said mixture to molecular distillation at a temperature ranging from 150° C. to 200° C. and pressure ranging from 0.8 Pa to 30 Pa.

When the fat-soluble trace constituents are concentrated and/or purified according to the method of the present invention, fixation of the trace constituents onto the condensing surface while conducting molecular distillation can be prevented and, as a result, the recovery rate is improved. In addition, even when low volatility impurities including pigments such as chlorophyll are present in the aforementioned impurities, it is still possible according to the present invention to concentrate the trace constituents and, at the same time, the aforementioned low volatility impurities also can be removed.

DETAILED DESCRIPTION OF THE PREFERRED EMBODIMENTS

In each of the embodiments of the present invention, there is no particular limitation for the fat-soluble trace constituents contained in a plant tissues and having a vapor pressure within a range of 0.1 to 30 Pa at temperature between 150° C. and 200° C., so long as they are trace constituents containing amounts of 5% or less in fat. In one embodiment, the fat-soluble trace constituent is a solid or viscous liquid (viscosity of 20 mPas or higher) at 25° C. under 1 atmospheric pressure.

Examples of the fat-soluble trace constituents include, but are not limited to, sesamins, sterols, sterol esters, tocopherols, ferulates, capsaicinoids, capsinoids, and combinations thereof, each of which is known to exhibit useful physiological activating functions.

Examples of sesamins include, for example, sesamin and sesamolin.

Examples of sterols include, for example, campesterol, stigmasterol, sitosterol, and combinations thereof.

Examples of tocopherols include, for example, α-tocopherol, γ-tocopherol, δ-tocopherol, and combinations thereof.

Examples of ferulates include, for example, ferulic acid and salts thereof.

Examples of capsinoids include, for example, capsiate, dihydrocapsiate, and combinations thereof.

Examples of capsaicinoids include, for example, capsaicin, dihydrocapsaicin, nordihydrocapsaicin, homocapsaicin, homodihydrocapsaicin, and combinations thereof.

The plant or plant material to be extracted, which contains the fat-soluble trace constituents in the present invention, may include but is not limited to, seeds of plants, plant roots, and plant tissues. Examples of the plant material include, but are not limited to, freeze-dried powder of red pepper, powder of red pepper dried by hot air, soybean pulp, rapeseed husks, and sesame seeds.

In extraction of the fat-soluble trace constituents in the present invention, the trace constituents may be extracted along with oil included in a plant tissue obtainable in such a manner as to pulverize, grind, compress, etc. the material to be extracted. On the other hand, the oil or the fat-soluble trace constituents may be extracted from the material to be extracted (plant tissues) by extraction with fat/oil and/or an organic solvent.

There is no particular limitation for the fat/oil which is used for the extraction in the present invention as far as it is edible oil, and examples include plant fat/oil such as soybean oil, rapeseed oil, corn oil and palm oil, and animal fat such as lard and tallow. With regard to the organic solvent, those listed in the Standards for Manufacture according to the Food Sanitation Law of Japan, such as hexane, methanol, and ethanol may be used. Each of them may be used alone, or two or more thereof may be used after mixing.

Examples of the fatty acid ester, which has vapor pressure of 0.06 to 30 Pa at temperature of 150° C. to 200° C., include glycerol esters of formic acid, acetic acid, propionic acid, butyric acid, valeric acid, caproic acid, caprylic acid and/or capric acid, and each may be used alone or in combination. The amount of the glycerol esters added to the extract is 1 to 25% by weight and, preferably, 10 to 20% by weight, based on the weight of the extract. When it is less than 1% by weight, the extracting effect is deteriorated while, when it is more than 25% by weight, the trace constituents are not concentrated and remain unextracted.

With regard to the conditions for purification, it is essential to conduct a molecular distillation under the conditions where the distilling temperature is 150° C. to 200° C. and the pressure is 0.8 Pa to 30 Pa. Outside this range, fixation of the trace constituents onto the condensing surface is significant, and that will result in disruption of the operation.

It is understood that the concentrated and/or purified fat-soluble trace constituent of the present invention are obtained at such a high quality, that they are very useful and may be provided in several food or drink products. Accordingly, the present invention provides novel food or drink products, which contain at least one food or drink and at least one concentrate of a fat-soluble trace component of a plant prepared according to the present invention. The present invention also provides methods for making a food or drink product by combining at least one food or drink and at least one concentrate of a fat-soluble trace component of a plant prepared according to the present invention.

The food and drink products include, but are not limited to, fermented food products, flavor extracts, sauces, juices, candy, and chewing gums. In the context of the present invention, the term food or drink product includes dietary supplements (such as vitamin supplements and vitamin/mineral supplements) and nutraceuticals.

Where a numerical limit or range is stated herein, the endpoints are included. Also, all values and subranges within a numerical limit or range are specifically included as if explicitly written out.

Other features of the invention will become apparent in the course of the following descriptions of exemplary embodiments which are given for illustration of the invention and are not intended to be limiting thereof.

EXAMPLES

Example 1

Oil was extracted from dry powder of red pepper containing tocopherol with n-hexane by a Soxhlet extractor using an apparatus mentioned in the Standard Analytical Methods for Fats/Oils 1.5-1996 and, after that, the solvent was removed by evaporation to give an extract composition.

The amount of tocopherol in this extract composition was measured by an HPLC method (pump: Hitachi L-6000; detector: Hitachi L-7485; detecting wavelength: fluorescence 295 nm/325 nm; column: GLscience Inertsil $NH_2$ 5 μm 4.6×250 mm; mobile phase: n-hexane/isopropyl alcohol=98.5/1.5 (v/v)) and the result was that α-tocopherol was 48.2 mg/100 g, γ-tocopherol was 16.2 mg/100 g, and δ-tocopherol was 17.4 mg/100 g, whereupon the total amount was 81.8 mg/100 g. When the concentration of chlorophyll was measured according to the Standard Analytical Method for Fats/Oils edited by Japanese Oil Chemists' Society, the result was 4,000 μg/g.

25% by weight of Glycerol tri caprylates (M-2 manufactured by Riken Vitamin) was added to the extract composition, and a molecular distillation was conducted using a falling thin film type molecular still manufactured by Taika Kogyo (evaporation heating area: 0.024 $m^2$; condenser area: 0.0088 $m^2$) under the condition where the evaporation heating temperature was 180° C., the degree of vacuum was 12 to 14 Pa, and the feeding amount of fat/oil was 1.1 g/min whereupon an efficient recovery of tocopherol was possible, because there was no fixation onto the condensing surface.

When the amount of tocopherol in this purified concentrate was measured by an HPLC method, the result was that α-tocopherol was 102.8 mg/100 g, γ-tocopherol was 40.4 mg/100 g, and δ-tocopherol was 59.5 mg/100 g, whereby the total amount was 202.7 mg/100 g, and the recovery rate was 81.1%. No chlorophyll was detected in this concentrated composition.

Example 2

Oil was extracted from dry powder of red pepper containing sterol with n-hexane by a Soxhlet extractor mentioned in the Standard Analytical Methods for Fats/Oils 1.5-1996 and, after that, solvent was removed by evaporation to yield an extract composition. The amount of sterol in this extract composition was measured by a GLC method (GLscience GC 353, column: Varian CP-SIL8CB 0.25 mm×25 m (0.25 μm); column temperature: 260° C.; injection temperature: 280° C.; detector (FID) temperature: 280° C.) and the result was that campesterol was 62.96 mg/100 g, stigmasterol was 133.0 mg/100 g, and sitosterol was 1,775 mg/100 g, whereupon the total amount was 2,538.3 mg/100 g.

25% by weight of Glycerol tri caprylates (M-2 manufactured by Riken Vitamin) was added to the extract composition, and a molecular distillation was conducted using a falling thin film type molecular still manufactured by Taika Kogyo (evaporation heating area: 0.024 $m^2$; condenser area: 0.0088 $m^2$) under the condition where the evaporation heating temperature was 180° C., the degree of vacuum was 5.7 to 6.0 Pa, and the feeding rate of fat/oil was 1.1 g/min. This resulted in removal of pigment components such as chlorophyll and efficient recovery of sterol since there was no fixation onto the condensing surface.

When the amount of sterol in this purified concentrate was measured by a GLC method (GLscience GC 353, column: Varian CP-SIL8CB 0.25 mm×25 m (0.25 μm); column temperature: 260° C.; injection temperature: 280° C.; detector (FID) temperature: 280° C.), the result was that campesterol was 1,536.2 mg/100 g, stigmasterol was 356.4 mg/100 g, and sitosterol was 3,631.7 mg/100 g, whereby the total amount was 5,524.3 mg/100 g and recovery rate was 71%.

Example 3

To sesame oil containing 2,900 mg/100 g of sesamin and sesamolin (analytical value found by HPLC; pump: Hitachi L-6300; detector: Hitachi L-7400; detecting wavelength: UV 290 nm; column: nacalai Cosmosil 5C18 AR-II 4.6 mm×250 mm; mobile phase: methano/distilled water=70/30 (v/v)) prepared by compression and/or extraction from sesame seeds was added 2% by weight (of the sesame oil) of glycerol tri caprylates (M-2 manufactured by Riken Vitamin), and a molecular distillation was conducted using a falling thin film type molecular still manufactured by Taika Kogyo (evaporation heating area: 0.024 $m^2$; condenser area: 0.0088 $m^2$) under the conditions where the evaporation heating temperature was 180° C., the degree of vacuum was 6.5 to 30 Pa, and the feeding rate of fat/oil was 3.0 g/min, whereupon an efficient recovery of sterol was possible because there was no fixation onto the condensing surface in spite of the fact that amount of sesamin and sesamolin were small. The amount of sesamin and sesamolin in this purified concentrate was 6,300 mg/100 g (analytical value found by HPLC pump was Hitachi L-6300, detector was Hitachi L-7400, detecting wavelength was UV 290 nm, column was nacalai Cosmosil 5C28 AR-II 4.6 mm×250 mm, mobile phase was methanol/distilled water=70/30 (v/v)), and the recovery rate was 70%.

Example 4

To 1 part by weight of dry powder of red pepper was used 10 parts by weight of rapeseed oil to extract capsaicinoids. The amount of capsaicinoids contained in this extract composition was measured by HPLC (pump: Hitachi L-6000; detector: Hitachi L-7485; detecting wavelength: fluorescence 280 nm/320 nm; column: YMC J'sphere ODS-H80 S-4 μm 8 nm 4.6 mm×150 mm; mobile phase: methanol/distilled water=80/20 (v/v)), and the result was 158 μg/g.

2% by weight of Glycerol tri caprylates (M-2 manufactured by Riken Vitamin) was added to the extract and a molecular distillation was conducted using a falling thin film type molecular still manufactured by Taika Kogyo (evaporation heating area: 0.024 $m^2$; condenser area: 0.0088 $m^2$) under the condition where the evaporation heating temperature was 180° C., the degree of vacuum was 18 Pa, and the feeding amount of fat/oil was 2.9 g/min, whereupon an efficient recovery of capsaicinoids was possible because there was no fixation onto the condensing surface in spite of the fact that amount of the capsaicinoids was very little.

When the amount of the capsaicinoids in this purified concentrate was measured by an HPLC method (pump: Hitachi L-6000; detector: Hitachi L-7485; detecting wavelength:

fluorescence 280 nm/320 nm; column: YMC J'sphere ODS-H80 S-4 μm 8 nm 4.6 mm×150 mm; mobile phase: methanol/distilled water=80/20 (v/v)), it was 8.0 mg/g (concentrated to an extent of about 50-fold), and the recovery rate was 72.1%. Detailed conditions are shown in Table 1.

Example 5

Oil was extracted from dry powder of red pepper containing capsinoids using n-hexane, by a Soxhlet extractor mentioned in the Standard Analytical Methods for Fats/Oils 1.5-1996 and, after that, solvent was removed by evaporation to give an extract composition. The amount of the capsinoids in this extract composition was measured by an HPLC method (pump: Hitachi L-6000; detector: Hitachi L-7485; detecting wavelength: fluorescence 280 nm/320 nm; column: YMC J'sphere ODS-H80 S-4 μm 8 nm 4.6 mm×150 mm; mobile phase: methanol/distilled water=80/20 (v/v)), and the result was 33.1 mg/g.

25% by weight of Glycerol tri caprylates (M-2 manufactured by Riken Vitamin) was added to the extract composition, and a molecular distillation was conducted using a falling thin film type molecular still manufactured by Taika Kogyo (evaporation heating area: 0.024 $m^2$; condenser area: 0.0088 $m^2$) under the conditions where the evaporation heating temperature was 180° C., the degree of vacuum was 12 to 14 Pa, and the feeding rate of fat/oil was 1.1 g/min, whereupon pigment components such as chlorophyll were removed, and an efficient recovery of the capsinoids was possible because there was no fixation onto the condensing surface.

When the amount of the capsinoids in this purified concentrate was measured, it was 100.5 mg/g and the recovery rate was 99.4%.

Example 6

Capsinoids were extracted from 1 part by weight of dry powder of red pepper containing capsinoids using 10 parts by weight of corn oil. The amount of the capsinoids contained in this extracted oil was measured by an HPLC method (pump: Hitachi L-6000; detector: Hitachi L-7485; detecting wavelength: fluorescence 280 nm/320 nm; column: YMC J'sphere ODS-H80 S-4 μm 8 nm 4.6 mm×150 mm; mobile phase: methanol/distilled water=80/20 (v/v)), and the result was 200 μg/g. Detailed conditions are shown in Table 1.

2% by weight of Glycerol tri caprylates (M-2 manufactured by Riken Vitamin) was added to the extracted oil and a molecular distillation was conducted using a falling thin film type molecular still manufactured by Taika Kogyo (evaporation heating area: 0.024 $m^2$; condenser area: 0.0088 $m^2$) under the conditions where the evaporation heating temperature was 180° C., the degree of vacuum was 6.5 to 30 Pa, and the feeding amount of fat/oil was 3.0 g/min whereupon an efficient recovery was possible because there was no fixation onto the condensing surface in spite of the fact that amount of the capsinoids was very little.

When the amount of the capsinoids in this purified concentrate was measured by an HPLC method (pump: Hitachi L-6000; detector: Hitachi L-7485; detecting wavelength: fluorescence 280 nm/320 nm; column: YMC J'sphere ODS-H80 S-4 μm 8 nm 4.6 mm×150 mm; mobile phase: methanol/distilled water=80/20 (v/v)), the result was that campesterol was 11.3 mg/100 g (concentrated to an extent of about 56-fold), and the recovery rate was about 100%. Detailed conditions are shown in Table 2.

Example 7

Capsinoids were extracted from 1 part by weight of dry powder of red pepper containing capsinoids using 10 parts by weight of safflower oil. The amount of the capsinoids contained in this extracted oil was measured by an HPLC method (pump: Hitachi L-6000; detector: Hitachi L-7485; detecting wavelength: fluorescence 280 nm/320 nm; column: YMC J'sphere ODS-H80 S-4 μm 8 nm 4.6 mm×150 mm; mobile phase: methanol/distilled water=80/20 (v/v)), and the result was 171 μg/g.

2% by weight of Glycerol tri caprylates (M-2 manufactured by Riken Vitamin) was added to the extracted oil and a molecular distillation was conducted using a falling thin film type molecular still manufactured by Taika Kogyo (evaporation heating area: 0.024 $m^2$; condenser area: 0.0088 $m^2$) under the conditions where the evaporation heating temperature was 180° C., the degree of vacuum was 0.8 Pa, and the feeding amount of fat/oil was 3.1 g/min, whereupon an efficient recovery was possible, because there was no fixation onto the condensing surface in spite of the fact that amount of the capsinoids was very little.

When the amount of the capsinoids in this purified concentrate was measured by an HPLC method (under the same conditions as above), the result was that campesterol was 13.1 mg/100 g (concentrated to an extent of about 77-fold), and the recovery rate was about 87%.

TABLE 1

| | Ex. 4: Oil Ext'd from Capsaicinoids (158 μg/g capsaicinoids) | Ex. 5: Oil Ext'd from Capsinoids (33 μg/g capsinoids) |
|---|---|---|
| Feeding Amount of Fat/Oil (g) | 40.0 | 26.0 |
| Amount of Glycerol tri-caprylate added | 0.8 (2.0% to oil) | 6.5 (25.0% to oil) |
| Temperature (° C.) | 180 | 180 |
| Degree of Vacuum (Pa) | 18 | 12 to 14 |
| Feeding Flow Rate (g/min) | 2.9 | 1.1 |
| Distillate (g) | 0.57 (1.4% to oil) | 8.51 (34.0% to oil) |
| Measured Conc. of Desired Constituents in Concentrated Distillate | 8.0 mg capsaicinoids/g | 100.5 mg capsinoids/g |
| Conc. when 100% of Desired Constituents are Recovered in Distillate | 11.1 mg capsaicinoids/g | 101.1 mg capsinoids/g |
| Recovery Rate | 72.1% | 99.4% |
| Residue (g) | 38.12 | 22.1 |
| Chlorophyll Conc. before Concentrating the Desired Constituents | 0.14 μg/g | 4,200 μg/g |
| Chlorophyll Conc. after Concentrating the Desired Constituents | 0 μg/g | 0 μg/g |

TABLE 2

| | Ex. 6: Oil Ext'd from Capsinoids Using Corn Oil (200 μg/g capsinoids) | Ex. 7: Oil Ext'd from Capsinoids Using Safflower Oil (170 μg/g capsinoids) |
|---|---|---|
| Feeding Amount of Fat/Oil (g) | 162.9 | 160.0 |

TABLE 2-continued

| | Ex. 6: Oil Ext'd from Capsinoids Using Corn Oil (200 μg/g capsinoids) | Ex. 7: Oil Ext'd from Capsinoids Using Safflower Oil (170 μg/g capsinoids) |
|---|---|---|
| Amount of Glycerol tri-caprylate Added | 3.3 (2.02% to oil) | 1.6 (1.0% to oil) |
| Temperature (° C.) | 180.0 | 180 |
| Degree of Vacuum (Pa) | 6.5 to 30 | 0.8 |
| Feeding Flow Rate (g/min) | 3.0 | 3.1 |
| Distillate (g) | 3.3 (2.02% to oil) | 1.8 (1.13% to oil) |
| Measured Conc. of Desired Constituents in Concentrated Distillate | 11.3 mg capsinoids/g | 13.1 mg capsinoids/g |
| Conc. when 100% of Desired Constituents are Recovered in Distillate | 9.87 mg capsinoids/g | 15.1 mg capsinoids/g |
| Recovery Rate | 114.5% | 86.8% |
| Residue (g) | 162.0 | 157.8 |
| Chlorophyll Conc. before Concentrating the Desired Constituents | 3,900 μg/g | 4,100 μg/g |
| Chlorophyll Conc. after Concentrating the Desired Constituents | 0 μg/g | 0 μg/g |

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of concentrating and purifying a fat-soluble trace constituent of a plant, said method comprising:
(a) extracting at least one fat-soluble trace constituent selected from the group consisting of a capsaicinoid and a capsinoid, which has a vapor pressure of 0.1 to 30 Pa at 150° C. to 200° C., from a plant tissue, to obtain an extract which comprises said at least one fat-soluble trace constituent;
(b) adding 1 to 25% by weight of a glycerol tri caprylate to said extract, to obtain a mixture; and
(c) subjecting said mixture to molecular distillation at a temperature ranging from 150° C. to 200° C. and pressure ranging from 0.8 Pa to 30 Pa.

2. The method according to claim 1, wherein said at least one fat-soluble trace constituent is extracted from said plant tissue with a fat/oil and an organic solvent by an extractor.

3. The method according to claim 2, wherein said at least one fat-soluble trace constituent is extracted from said plant tissue with an edible oil.

4. The method according to claim 3, wherein said edible oil comprises a plant oil selected from the group consisting of soybean oil, rapeseed oil, corn oil, palm oil, safflower oil, and combinations thereof.

5. The method according to claim 2, wherein said at least one fat-soluble trace constituent is extracted from said plant tissue with a fat which is an animal fat selected from the group consisting of lard, tallow, and combinations thereof.

6. The method according to claim 2, wherein said at least one fat-soluble trace constituent is extracted from said plant tissue with an organic solvent which comprises one or more members selected from the group consisting of methanol, ethanol, hexane, and isopropyl alcohol.

7. The method according to claim 1, wherein said at least one fat-soluble trace constituent is extracted from said plant tissue by compression, pulverization, or grinding.

8. The method according to claim 1, wherein said at least one fat-soluble trace constituent is a solid at 25° C. under 1 atmospheric pressure.

9. The method according to claim 1, wherein said at least one fat-soluble trace constituent is a liquid which has a viscosity of 20 mPas or higher at 25° C. under 1 atmospheric pressure.

10. The method according to claim 1, wherein said at least one fat-soluble trace constituent is a capsaicinoid.

11. The method according to claim 1, wherein said at least one fat-soluble trace constituent is a capsinoid.

12. The method according to claim 1, wherein said plant tissue is selected from the group consisting of freeze-dried powder of red pepper, and powder of red pepper dried by hot air.

13. The method according to claim 1, further comprising at least one fatty acid ester comprising one or more members selected from the group consisting of glycerol esters of formic acid, acetic acid, propionic acid, butyric acid, valeric acid, caproic acid, caprylic acid and capric acid.

14. The method according to claim 1, wherein 10 to 20% by weight of said glycerol tri caprylate is added to said extract.

15. A method of making a concentrate of a fat-soluble trace constituent of a plant, said method comprising:
(a) extracting at least one fat-soluble trace constituent selected from the group consisting of a capsaicinoid and a capsinoid, which has a vapor pressure of 0.1 to 30 Pa at 150° C. to 200° C., from a plant tissue, to obtain an extract containing said at least one fat-soluble trace constituent;
(b) adding 1 to 25% by weight of a glycerol tri caprylate to said extract, to obtain a mixture;
(c) subjecting said mixture to molecular distillation at a temperature ranging from 150° C. to 200° C. and pressure ranging from 0.8 Pa to 30 Pa; and
(d) recovering a concentrate of a fat-soluble trace constituent of a plant.

16. A concentrated and purified fat-soluble trace constituent of a plant which is prepared by a method according to claim 15.

17. A food or drink product, which comprises:
(A) at least one food or drink; and
(B) at least one concentrate of a fat-soluble trace component of a plant, wherein said at least one concentrate of a fat-soluble trace component of a plant is prepared by a method according to claim 15.

18. A method of making a food or drink product, said method comprising:
(1) combining:
(A) at least one food or drink; and
(B) at least one concentrate of a fat-soluble trace component of a plant, wherein said at least one concentrate of a fat-soluble trace component of a plant is prepared by a method according to claim 15.

19. A food or drink product which is prepared by a method according to claim 18.

* * * * *